(12) United States Patent
Kikuyama et al.

(10) Patent No.: US 6,740,450 B2
(45) Date of Patent: May 25, 2004

(54) HYDROGEN-ABSORBING ALLOY FOR BATTERY, METHOD FOR PRODUCING THE SAME, AND ALKALINE STORAGE BATTERY USING THE SAME

(75) Inventors: Susumu Kikuyama, Kamakura (JP); Takashi Ebihara, Kamakura (JP); Akiko Miyahara, Chigasaki (JP); Xianglong Wang, Atsugi (JP); Kohji Yuasa, Chigasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 323 days.

(21) Appl. No.: 09/910,760

(22) Filed: Jul. 24, 2001

(65) Prior Publication Data
US 2001/0054458 A1 Dec. 27, 2001

Related U.S. Application Data (62) Division of application No. 09/234,294, filed on Jan. 21, 1999, now abandoned.

(30) Foreign Application Priority Data

| Feb. 19, 1998 | (JP) | 10-036977 |
| Mar. 23, 1998 | (JP) | 10-073809 |
| Mar. 23, 1998 | (JP) | 10-073824 |
| Mar. 23, 1998 | (JP) | 10-073825 |
| Mar. 23, 1998 | (JP) | 10-073826 |
| Nov. 24, 1998 | (JP) | 10-332399 |

(51) Int. Cl.[7] .......... H01M 4/32; H01M 4/52; H01M 4/58; C01B 6/24
(52) U.S. Cl. ............. 429/223; 429/218.2; 420/900
(58) Field of Search .......... 429/218.1, 218.2, 429/223; 148/513; 420/900; 29/623.5

(56) References Cited

U.S. PATENT DOCUMENTS

| 4,716,088 A | 12/1987 | Reichman et al. |
| 4,728,586 A | 3/1988 | Venkatesan et al. |
| 5,455,125 A * | 10/1995 | Matsumoto et al. .......... 429/59 |
| 5,536,591 A | 7/1996 | Fetcenko et al. |
| 5,879,429 A | 3/1999 | Yamamura et al. |
| 5,935,732 A | 8/1999 | Matsumura et al. |
| 6,040,087 A * | 3/2000 | Kawakami .............. 429/218.1 |

FOREIGN PATENT DOCUMENTS

| EP | 0696823 | 2/1996 |
| EP | 0271043 | 6/1998 |
| JP | 61285658 | 12/1986 |
| JP | 3152868 | 6/1991 |
| JP | 5225972 | 9/1993 |
| JP | 9171821 | 6/1997 |

OTHER PUBLICATIONS

Patent Abstracts of Japan, vol. 97, No. 10, Oct. 31, 1997, and JP 9-171821A (Toyota Autom Loom Works Ltd.), Jun. 30, 1997.

* cited by examiner

Primary Examiner—Patrick Ryan
Assistant Examiner—Julian Mercado
(74) Attorney, Agent, or Firm—Stevens, Davis, Miller & Mosher, LLP

(57) ABSTRACT

An alkaline storage battery which is excellent in charge and discharge cycle life characteristics and high-rate discharge characteristics is provided by constructing it using an electrode made of an MmNi type hydrogen-absorbing alloy powders having modified surface. The alkaline storage battery comprises a negative electrode made using a hydrogen-absorbing alloy in the form of powders comprising at least one rare earth element, nickel and at least one transition metal in which the surface portion of the alloy has nickel in metallic state exposed at the surface, pores positioned between the nickel and the nickel, and a nickel-rich layer present on the alloy surface contacting with the pores, a positive electrode made using a metal oxide, a separator, and an alkaline electrolyte.

30 Claims, 1 Drawing Sheet (a) AFTER WET GRINDING
(b) AFTER ALKALI TREATMENT
(c) AFTER ACID TREATMENT
(d) AFTER DEHYDROGENATION TREATMENT
(e) AFTER MODIFICATION WITH OH⁻ GROUP

HYDROGEN-ABSORBING ALLOY FOR BATTERY, METHOD FOR PRODUCING THE SAME, AND ALKALINE STORAGE BATTERY USING THE SAME

This is a division of application Ser. No. 09/234,294, filed Jan. 21, 1999, now abandoned.

BACKGROUND OF THE INVENTION

1. Field of the Invention

The present invention relates to an alkaline storage battery, a hydrogen-absorbing alloy used therefor, and a method for producing the same.

2. Description of Related Art

Nickel-metal hydride storage batteries practically made using hydrogen-absorbing alloys have the characteristics such as low environmental pollution and high energy density. The batteries are being widely used as electric sources of various cordless equipment and electronic equipment. Furthermore, from the points of their excellent capacity and reliability, these batteries are considered to be most promising for electric power sources of electric tools and electric vehicles which require charging and discharging at high-rate.

The charge and discharge reaction at a negative electrode comprising a hydrogen-absorbing alloy in nickel-metal hydride storage batteries is shown by the following formula (1). In the charging stage, the hydrogen-absorbing alloy negative electrode electrochemically takes hydrogen atom into the alloy from water. In the discharging stage, the hydrogen absorbed in the alloy is electrochemically oxidized to return to water.

(M: Hydrogen-absorbing alloy)

As materials of negative electrodes for nickel-metal hydride storage batteries, generally used are $MmNi_5$ (Mm denotes a mixture of rare earth elements) alloys having a crystal structure of $CaCu_5$ type in which a part of Ni is replaced with a metal such as Co, Mn or Al.

In such hydrogen-absorbing alloy in the form of powders, an oxide or hydroxide is formed on the surface owing to spontaneous oxidation. The specific surface area of the alloy powders is small and the initial charge and discharge capacity as an electrode are low. Thus activation is needed. Furthermore, since hydroxides of rare earth elements are insulating, when they precipitate on the alloy surface, electric conductivity lowers and charge and discharge characteristics at high-rate become insufficient.

Moreover, the elements such as Mn and Al readily dissolve into an alkaline electrolyte and precipitate as an oxide or hydroxide. The dissolution and precipitation of these elements cause reduction in capacity of the hydrogen-absorbing alloy, increase of internal pressure in charging and deterioration of charge and discharge cycle life.

For enhancing activation of hydrogen-absorbing alloys, JP-A-61-285658 discloses a method of immersing hydrogen-absorbing alloy in an alkaline aqueous solution, and JP-A-3-152868 discloses a method of treating hydrogen-absorbing alloy with an acidic aqueous solution and then with an alkaline aqueous solution.

According to the disclosure of the above patent publications, elements on the surface of hydrogen-absorbing alloy which readily dissolve in an alkaline aqueous solution are removed by the alkali treatment. The removal of the elements results in formation of an active nickel-rich layer in the surface portion to improve the initial activation characteristics. However, since the alkali treatment results in formation of insulating hydroxides of low solubility (e.g., hydroxides of rare earth elements) on the surface of hydrogen-absorbing alloy, contact resistance between particles increases and electrical conductivity decreases. Furthermore, if the surface is covered with the hydroxide layer, the nickel-rich layer present under the hydroxide layer cannot sufficiently exhibit catalytic action. As a result, the initial activity and charge and discharge characteristics at a large current are insufficient.

In order to remove the hydroxides to enhance the high-rate charge and discharge characteristics, JP-A-5-225975 discloses a method of treating with a strongly acidic aqueous solution such as hydrochloric acid, and JP-A-9-171821 discloses a method of treating with an alkaline aqueous solution and then with an acidic aqueous solution. These methods remove the hydroxide film formed on the alloy surface by an acid treatment, and form a nickel-rich layer on the alloy surface to improve activity of hydrogen-absorbing alloy and high-rate charge and discharge characteristics.

BRIEF SUMMARY OF THE INVENTION

However, according to the treatments of the above conventional techniques, hydrogen is produced by the alkali treatment as shown in the formula (2) and by the acid treatment as shown in the formula (3). A part of the produced hydrogen is released as a gas as shown in the formula (4), but most of the hydrogen is absorbed in the hydrogen-absorbing alloy as shown in the formula (5). When hydrogen is absorbed in the alloy, this reacts with oxygen in the air at the step of being exposed to the air for drying or the like as shown in the formula (6) to generate heat (Q). The nickel portion on the surface of the hydrogen-absorbing alloy is oxidized owing to the generation of heat, resulting in reduction of catalytic effect.

(2)

(3)

(4)

(5)

(6)

(M: Hydrogen-absorbing alloy)

As a result, the initial activity and the high-rate charge and discharge characteristics decrease. Moreover, hydrogen produced at the high-rate charging is difficult to be rapidly absorbed into the hydrogen-absorbing alloy to cause increase of internal pressure and deterioration of battery cycle life.

Thus, sufficient high-rate discharge characteristics at the initial charge and discharge cycle cannot be obtained only by the removal of the oxide layer or hydroxide layer on the surface of the hydrogen-absorbing alloy or the formation of the nickel-rich layer on the surface of alloy powders according to the above conventional techniques, and this is not sufficient in the use for electric vehicles or electric tools which are demanded to have a high output.

The main object of the present invention is to provide an alkaline storage battery which is excellent in internal pressure characteristics, charge and discharge cycle life and high-rate discharge characteristics.

For attaining the above object, the present invention provides a hydrogen-absorbing alloy for batteries in the form of powder comprising at least one rare earth element, nickel and at least one transition metal in which nickel in metallic state is exposed at the surface portion of the alloy, pores are positioned between said nickel and nickel, and a nickel-rich layer is present on the alloy surface which contacts with the pores.

The above alloy is produced by a method which comprises a first step of grinding a hydrogen-absorbing alloy comprising at least one rare earth element, nickel and at least one transition metal to prepare alloy powders, a second step of treating the alloy powder in an alkaline aqueous solution, a third step of treating the alloy powders in an acidic aqueous solution, and a fourth step of dehydrogenation treatment to remove hydrogen absorbed in the alloy powders in the presence of acetate ion in an aqueous solution. More preferably, the method comprises a fifth step of adding an alkali to the aqueous solution after the fourth step to modify with OH⁻ group the surface of the alloy powders and the surface of alloy contacting with the pores.

DETAILED DESCRIPTION OF THE INVENTION

The first embodiment of the present invention relates to a hydrogen-absorbing alloy for batteries in the form of powders comprising at least one rare earth element, nickel and at least one transition metal in which metallic nickel 4 is exposed at the surface portion of the alloy powder 1, pores 6 are positioned between nickel 4 and nickel 4, and a nickel-rich layer 7 is present on the alloy surface contacting with the pores 6 as shown in FIG. 1(d). This hydrogen-absorbing alloy can be produced by the second embodiment.

Alkaline storage batteries using a hydrogen-absorbing alloy electrode produced using the hydrogen-absorbing alloy having the above surface structure have the following features.

(1) Nickel of metallic state is exposed, and a high catalytic effect and an excellent electrical conductivity are obtained. Since contact resistance between alloy powders in the electrode is small, the batteries are excellent in high-rate charge and discharge characteristics.

(2) Substantially no elements readily dissolved into alkaline electrolyte, such as Mn and Al, are present on the surface of alloy powders, and substantially no precipitates are produced and the capacity hardly decreases. Accordingly, increase of the internal pressure at the high-rate charging is inhibited, and charge and discharge cycle is long.

(3) Many pores are formed in the surface portion of alloy powders and the specific surface area of the alloy powders is increased. Moreover, on the alloy surface contacting with the pores, there are few elements such as Mn and Al which are readily dissolved in the alkaline electrolyte and said alloy surface contacting with the pores has a nickel-rich layer high in electrochemical catalytic activity. Therefore, the high-rate discharge characteristics and cycle life characteristics are further improved.

Therefore, an alkaline storage battery excellent in high-rate charge and discharge characteristics, internal pressure characteristics and cycle life characteristics can be provided by using the hydrogen-absorbing alloy of the present invention.

As the hydrogen-absorbing alloys, those which contain at least one rare earth element, nickel and at least one transition metal are used. The rare earth elements are preferably a Misch metal which is a mixture of rare earth elements, and the transition metals are preferably Co, Mn and Al.

The second embodiment of the present invention relates to a method for producing a hydrogen-absorbing alloy for batteries which comprises a first step of grinding a hydrogen-absorbing alloy containing at least one rare earth element, nickel and at least one transition metal to prepare alloy powders, a second step of treating the alloy powders in an alkaline aqueous solution, a third step of treating the alloy powders in an acidic aqueous solution, and a fourth step of dehydrogenation treatment which comprises removing hydrogen absorbed in the alloy powders in the presence of acetate ion in an aqueous solution.

The method of grinding of alloy in the first step is preferably wet grinding in water or an aqueous solution. This is because local oxidation of the alloy surface can be inhibited as compared with the case of dry grinding and the subsequent treatments can be more uniformly performed. Unavoidable segregation phase portions (the portions where Misch metal and Mn concentrically present and which are unavoidably present in the preparation of hydrogen-absorbing alloy) present in the alloy are etched by the subsequent acid treatment to form pores, and if the portions are oxidized at the grinding, they are difficult to be etched and the pores are not sufficiently formed.

In the second step, readily oxidizable rare earth elements or metal components such as Mn and Al are selectively dissolved out from the surface of alloy powders by the alkali treatment and nickel 4 of metallic state is formed on the surface of alloy powders as shown in FIG. 1(b). However, rare earth elements dissolved form hydroxides of rare earth elements of low solubility, which are precipitated on the alloy surface.

In the third step, rare earth hydroxide layer 3 which covers nickel 4 of metallic state shown in FIG. 1(b) is removed by the acid treatment, and nickel 4 in metallic state is reticulately exposed on the surface of alloy powders and, simultaneously, pores 6 are formed from the surface of alloy powders toward the center of the powders between the reticulated nickel 4 and nickel 4. The state of this surface of the alloy powders is shown in FIG. 1(c). The pores have mainly V-shaped or U-shaped section, but the shape is not limiting. Depth of the pores from the surface is not definite, but it is preferred that many shallow pores are formed on the surface.

In the fourth step, the dehydrogenation treatment of removing hydrogen 5 absorbed in the alloy powders 1 as shown in FIG. 1(c) during the second step and the third step in the presence of acetate ion in an aqueous solution is carried out, whereby heat is diffused into water and hydrogen 5 absorbed in the alloy 1 is removed without oxidizing the nickel 4 on the surface of alloy powder 1. In addition to the removal of hydrogen 5, this dehydrogenation treatment further dissolves out the readily oxidizable rare earth elements or metal components such as Mn and Al from the alloy surface contacting with pores 6, whereby the nickel-rich layer 7 as shown in FIG. 1(d) can be formed. This nickel-rich layer means a layer higher in nickel concentration than other portions in the hydrogen-absorbing alloy powders.

The presence of acetate ion here is important. Unless the acetate ion is present, it is difficult to remove the rare earth elements or transition metals such as Mn and Al on the alloy surface contacting with the pores as mentioned below.

When the dehydrogenation treatment is carried out in the presence of acetate ion, a dehydrogenating agent reacts also with acetate ion to produce peracetate ion since the agent has an oxidization property. For example, hydrogen peroxide reacts with acetate ion to produce peracetate ion as shown in the following formula (7). Since peracetate ion acts as an oxidizing agent having a relatively weak oxidative action, it selectively dissolves and removes the readily oxidizable rare earth elements or transition metals such as Mn and Al as shown in the following formula (8), and, on the other hand, condenses the nickel having high oxidation resistance in metallic state.

$$CH_3COO^- + H_2O_2 \rightarrow CH_3COOO^- + H_2O \quad (7)$$

$$2A + CH_3COOO^- + H_2O \rightarrow 2A^+ + CH_3COO^- + 2OH^- \quad (8)$$

(A: Rare earth element, transition metal)

Furthermore, acetate ion is a complex group, and the rare earth elements or metal components such as Mn and Al which are dissolved out bond to acetate ion to form a complex compound high in solubility, which is easily removed. In this way, nickel-rich layer 7 is formed on the surface of alloy 1 which contacts with pores 6 as shown in FIG. 1(d). The amount of acetate ion is preferably 0.005 to 3.0% by weight, more preferably 0.01 to 0.15% by weight based on the hydrogen-absorbing alloy powder.

Specific processes of the dehydrogenation treatment are shown in the following (1)–(3).

(1) Oxygen is used as a dehydrogenating agent. Specifically, alloy powders are stirred in an aqueous solution containing acetate ion with blowing air or oxygen into the aqueous solution.

(2) A peroxide represented by the formula $B_2O_2$ is used as a dehydrogenating agent, and alloy powders are stirred in an aqueous solution containing acetate ion with adding the peroxide to the aqueous solution. The peroxide reacts with water to produce active oxygen, which reacts with hydrogen absorbed in the alloy powders and diffused to the surface of the alloy powders. Thus, hydrogen can be easily removed. As the peroxide, it is preferred to use one in which B is H, Li, Na or K, and especially preferred is aqueous hydrogen peroxide (B=H). As shown in the following formula (9), it reacts with hydrogen absorbed in the hydrogen-absorbing alloy to produce water. When hydrogen peroxide is used, no products other than water are formed, and the handling is very easy.

$$2MH + H_2O_2 \rightarrow 2M + 2H_2O \quad (9)$$

(M: Hydrogen-absorbing alloy)

(3) A peroxodisulfate represented by the formula $D_2S_2O_8$ is used as a dehydrogenating agent, and alloy powders are stirred in an aqueous solution containing acetate ion with adding the peroxodisulfate to the aqueous solution. The peroxodisulfate reacts with water to produce active oxygen, which reacts with hydrogen absorbed in the alloy powders and diffused to the surface of the alloy powders. Thus, hydrogen can be easily removed. As the peroxodisulfate, it is preferred to use one in which D is Li, Na or K.

Other steps such as a drying step may be provided between the first step, the second step, the third step and/or the fourth step. However, preferably, these four steps are carried out in succession because if the segregation phase portions are oxidized by drying, it becomes difficult to form the pores.

The third embodiment of the present invention relates to an alkaline storage battery comprising a negative electrode using hydrogen-absorbing alloy powders comprising at least one rare earth element, nickel and at least one transition metal, a positive electrode using a metal oxide, a separator and an alkaline electrolyte, in which nickel of metallic state is exposed at the surface portion of the alloy powders, pores are positioned between the nickel and nickel, and a nickel-rich layer is present on the alloy surface contacting with the pores. Thus, an alkaline storage battery excellent in high-rate discharge characteristics and cycle life can be provided.

The fourth embodiment of the present invention relates to hydrogen-absorbing alloy powders comprising at least one rare earth element, nickel and at least one transition metal in which nickel 4 in metallic state is exposed at the surface portion of the alloy powder 1, pores 6 are positioned between nickel 4 and nickel 4, a nickel-rich layer 7 is present on the alloy surface contacting with the pores 6, and the surface portion of the alloy powders 1 and the surface of the nickel-rich layer 7 are modified with $OH^-$ group 8 as shown in FIG. 1(e).

By constructing a battery using a hydrogen-absorbing alloy negative electrode made of the hydrogen-absorbing alloy powders having the above surface structure, there can be provided an alkaline storage battery which is inhibited from increase in internal pressure at the time of high-rate charging and prolonged in charge and discharge cycle life, and besides is excellent in high-rate discharging from the initial charge and discharge cycle.

The fifth embodiment of the present invention relates to a method for producing a hydrogen-absorbing alloy for batteries which includes a first step of grinding a hydrogen-absorbing alloy containing at least one rare earth element, nickel and at least one transition metal to prepare alloy powders, a second step of treating the alloy powder in an alkaline aqueous solution, a third step of treating the alloy powders in an acidic aqueous solution, a fourth step of dehydrogenation treatment to remove hydrogen absorbed in the alloy powders in the presence of acetate ion in an aqueous solution, and a fifth step of adding an alkali to the aqueous solution. Thus, the surface portion of the alloy powders and the surface portion of the nickel-rich layer formed on the alloy surface which contacts with the pores positioned between nickel and nickel can be modified with $OH^-$ group (i.e., $OH^-$ group can be added to these surface portions).

In the nickel-metal hydride storage battery, as shown in the formula (1), the discharge reaction of the hydrogen-absorbing alloy negative electrode is a reaction of the absorbed hydrogen being electrochemically oxidized and bonding to $OH^-$ group on the surface of alloy powders to return to water. Usually, $OH^-$ group around the surface of alloy powders is instantaneously consumed at high-rate discharging. The $OH^-$ group further needed is supplied from electrolyte by diffusion, but in case the consumption exceeds the supply, polarization of the negative electrode increases to cause decrease of the discharge voltage.

The above phenomenon is conspicuous especially during a few cycles from the initial charge and discharge cycle. According to the fifth embodiment of the present invention, the surface portion of the alloy powders and the alloy surface which contacts with the pores are modified with $OH^-$ group and, hence, sufficient $OH^-$ group can be instantaneously provided at the time of high-rate discharging. Thus, excellent high-rate discharge characteristics can be obtained even at the initial stage of the charge and discharge cycle.

If pH of the aqueous solution in modification with $OH^-$ group is lower than 10, amount of the $OH^-$ group added is decreased, and improvement of high-rate discharge characteristics from the initial stage of the charge and discharge cycle of the battery is small. Therefore, it is preferred to adjust pH of the alkaline aqueous solution to the range of 10–14 in modification with OH⁻ group.

If pH of the aqueous solution in modification with OH⁻ group is higher than 13, the high-rate discharge characteristics from the initial stage of the charge and discharge cycle of the battery is improved, but the internal pressure characteristics and the charge and discharge cycle life characteristics are deteriorated. Therefore, in order to provide a battery which is further excellent in internal pressure and charge and discharge cycle life characteristics in addition to the high-rate discharge characteristics from the initial stage of charge and discharge cycle of the battery, it is most preferred to adjust pH of the alkaline aqueous solution to the range of 11–13 in modification with OH⁻ group.

The sixth embodiment of the present invention relates to a method for producing a hydrogen-absorbing alloy electrode which comprises preparing a paste by kneading a thickening agent or a binder and water with hydrogen-absorbing alloy powders comprising at least one rare earth element, nickel and at least one transition metal in which nickel in metallic state is exposed at the surface portion of the alloy powders, pores are positioned between said nickel and nickel, a nickel-rich layer is present on the alloy surface contacting with the pores, and the surface portion of the alloy powders and the surface of the nickel-rich layer are modified with OH⁻ group, and then coating the paste on a metal substrate.

It is preferred to specify pH of the paste to be 10–14, more preferably 11–13. If pH of the paste is low, the OH⁻ group on the alloy surface and the surface of the nickel-rich layer is dissolved into the paste, and, hence, it is difficult to obtain sufficient high-rate discharge characteristics from the initial stage of charging and discharging of the battery. If pH of the paste is high, the additives and binder in the paste are deteriorated, and coating of the paste on a metal substrate becomes difficult and mass-productivity becomes lower.

The seventh embodiment of the present invention relates to an alkaline storage battery comprising a negative electrode using hydrogen-absorbing alloy powders comprising at least one rare earth element, nickel and at least one transition metal, a positive electrode using a metal oxide, a separator and an alkaline electrolyte in which nickel 4 in metallic state is exposed at the surface portion of the alloy powders of the negative electrode, pores 6 are positioned between nickel 4 and nickel 4, a nickel-rich layer 7 is present on the alloy surface contacting with the pores, and the surface of nickel 4 in metallic state and the surface of the nickel-rich layer 7 are modified with OH⁻ group 8 as shown in FIG. 1(e). Thus, there can be provided an alkaline storage battery which is inhibited from increase in internal pressure at high-rate charging and prolonged in charge and discharge cycle life, and besides is excellent in high-rate discharging at the initial stage of the charge and discharge cycle.

EXAMPLE

Examples of the present invention will be explained in detail below, but the present invention is not limited to these examples.

Example 1

Figure 1:
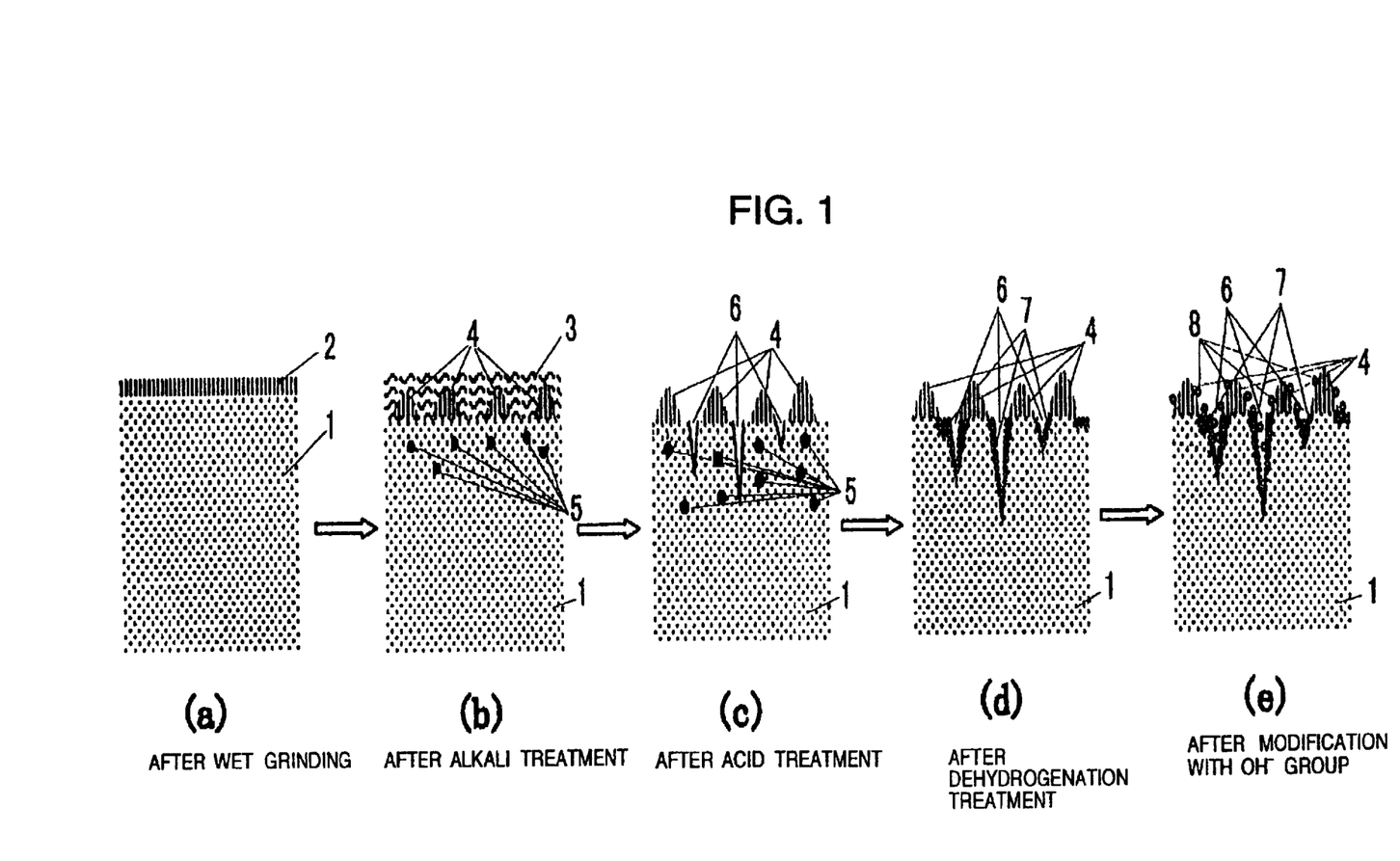
FIG. 1 is a schematic sectional view showing the surface states of the hydrogen-absorbing alloy powders after subjected to the steps in the examples of the present invention.

Preparation of Nickel-metal Hydride Storage Battery A1:

A hydrogen-absorbing alloy represented by $MmNi_{3.55}Co_{0.75}Mn_{0.4}Al_{0.3}$ (Mm denotes a Misch metal which is a mixture of rare earth elements and is referred to as Mm hereinafter) was used as mother alloy 1. This was ground to an average particle diameter of 30 μm in water by a wet ball mill to prepare alloy powders. FIG. 1(a) is a schematic sectional view of the surface portion of the resulting alloy powders. In FIG. 1(a), 1 indicates a mother alloy, 2 indicates a hydroxide and oxide layer film.

The alloy powders were subjected to an alkali treatment by stirring at a temperature of 80° C. for 60 minutes in an aqueous KOH solution having a specific gravity of 1.30. FIG. 1(b) is a schematic sectional view of the surface portion of the thus treated alloy powders, in which 1 indicates the mother alloy, 3 indicates a rare earth element hydroxide layer, 4 indicates nickel in metallic state, and 5 indicates hydrogen atom. The alloy powders were washed with water until pH of the washing water after washing reached 10 or less.

Then, the alloy powders were subjected to an acid treatment by stirring at 60° C. for 20 minutes in an aqueous acetic acid solution of pH 3.0. FIG. 1(c) is a schematic sectional view of the surface portion of the alloy powders in this state, in which 1 indicates the mother alloy, 4 indicates nickel in metallic state, 5 indicates hydrogen atom, and 6 indicates pores.

Then, the alloy powders were subjected to dehydrogenation treatment in such a state that a given amount of acetate ion was retained. That is, the alloy powders were stirred in an aqueous solution containing acetate ion in an amount of 0.05% by weight based on the alloy with 1.5 kgf/cm² of compressed air being bubbled for 1 hour through a diffusion filter having a pore diameter of 10 μm.

The thus treated alloy powders were dried for the removal of water to obtain hydrogen-absorbing alloy powders a1 of Example 1 of the present invention. FIG. 1(d) is a schematic sectional view showing the state of the surface portion of the alloy powders a1, in which 1 indicates the mother alloy, 4 indicates nickel in metallic state, and 7 indicates a nickel-rich layer.

In this example, in preparation of the hydrogen-absorbing alloy powders a1, stirring was carried out in an aqueous acetic acid solution as an acid treatment and consecutively dehydrogenation treatment was carried out in such a state that a given amount of acetate ion was retained. The acid treatment may be carried out using other acids than acetic acid, and, for example, the acid treatment may be carried out using hydrochloric acid or hydrofluoric acid and successively the dehydrogenation treatment may be carried out in the presence of acetate ion by adding acetic acid or an acetic acid compound.

In order to evaluate characteristics of the treated alloy powders a1 as material for battery, a nickel-metal hydride storage battery A1 was made in the following manner. 100% by weight of the hydrogen-absorbing alloy powders a1 were mixed with 0.15% by weight of carboxymethylcellulose as a thickening agent, 0.3% by weight of carbon black as a conductive agent, 0.8% by weight of styrene-butadiene copolymer as a binder, and water as a dispersing medium to prepare a paste. This paste was coated on a core material comprising a punching metal, followed by drying and pressing. Furthermore, a fluorocarbon resin powders were coated on the surface, and therefrom was made a hydrogen-absorbing alloy negative electrode of 35 mm in width and 0.4 mm in thickness and 2200 mAh in capacity. This negative electrode was combined with a known sintered nickel positive electrode of 1500 mAh in electric capacity and a polypropylene nonwoven fabric separator, and these were spirally rolled to make an electrode plate group. This electrode plate group was inserted in a metallic case, into which was poured an electrolyte prepared by dissolving 40 g/l of lithium hydroxide in an aqueous potassium hydroxide solution of 1.30 in specific gravity, followed by sealing this case at the top thereof with a sealing plate to make a nickel-metal hydride storage battery A1 of 4/5A size and 1500 mAh in nominal capacity.

Preparation of Nickel-metal Hydride Storage Battery A2:

The wet grinding, the surface alkali treatments and the acetic acid treatment were carried out under the same conditions as in the preparation of the hydrogen-absorbing alloy a1. Then, as the dehydrogenation treatment, the alloy powders were stirred in an aqueous solution containing acetate ion with adding finely ground sodium peroxide in an amount of 5% by weight based on the alloy, followed by further stirring for 10 minutes and washing with water twice. Then, the alloy powders were dried to prepare a hydrogen-absorbing alloy a2 of Example 1 of the present invention. A nickel-metal hydride storage battery A2 of Example 1 having the same construction as the battery A1 was made in the same manner as in making battery A1, except that the negative electrode was made using the alloy powders a2.

Preparation of Nickel-metal Hydride Storage Battery A3:

The wet grinding, the surface alkali treatment and the subsequent acetic acid treatment were carried out under the same conditions as in the preparation of the hydrogen-absorbing alloy a1. Then, as the dehydrogenation treatment, the alloy powders were stirred in an aqueous solution containing acetate ion with adding finely ground potassium peroxodisulfate in an amount of 17% by weight based on the alloy, followed by further stirring for 10 minutes and washing with water twice. Then, the alloy powders were dried to prepare a hydrogen-absorbing alloy a3 of Example 1 of the present invention. A nickel-metal hydride storage battery A3 of Example 1 having the same construction as the battery A1 was made in the same manner as in making battery A1, except that the negative electrode was made using the alloy powders a3.

Preparation of Nickel-metal Hydride Storage Battery A4:

The wet grinding, the surface alkali treatment and the subsequent acetic acid treatment were carried out under the same conditions as in the preparation of the hydrogen-absorbing alloy a1. Then, as the dehydrogenation treatment, the alloy powders were stirred in an aqueous solution containing acetate ion at 50° C. with adding aqueous hydrogen peroxide having a concentration of 10% by weight in an amount of 1.5% by weight in terms of hydrogen peroxide based on the alloy, followed by stirring for 10 minutes and washing with water twice. The washing water after washing twice had a pH of about 7. Then, the alloy powders were dried to prepare a hydrogen-absorbing alloy a4 of Example 1 of the present invention. A nickel-metal hydride storage battery A4 of Example 1 having the same construction as the battery A1 was made in the same manner as in making battery A1, except that the negative electrode was made using the alloy powders a4.

Preparation of Nickel-metal Hydride Storage Battery B1:

The wet grinding, the surface alkali treatment and the subsequent acetic acid treatment were carried out under the same conditions as in the preparation of the hydrogen-absorbing alloy a1. Then, the alloy powders were washed with water twice without carrying out the dehydrogenation treatment, followed by drying the alloy powders in the air to prepare a hydrogen-absorbing alloy b1 of comparative example. A nickel-metal hydride storage battery B1 of comparative example having the same construction as the battery A1 was made in the same manner as in making battery A1, except that the negative electrode was made using the alloy powders b1.

Preparation of Nickel-metal Hydride Storage Battery B2:

The surface alkali treatment and the subsequent acetic acid treatment were carried out under the same conditions as in the preparation of the hydrogen-absorbing alloy a1. Then, the alloy powders were washed with water twice without carrying out the dehydrogenation treatment, followed by drying the alloy powders using an inert gas to prepare a hydrogen-absorbing alloy b2 of comparative example. A nickel-metal hydride storage battery B2 of comparative example having the same construction as the battery A1 was made in the same manner as in making battery A1, except that the negative electrode was made using the alloy powders b2 in an inert gas globe box.

Battery Test:

Each of the batteries A1–A4 made in the above example and batteries B1 and B2 made in the above comparative example was subjected to initial activation of the battery by carrying out charging and discharging of two cycles. One cycle of charging and discharging comprised charging to 150% of positive electrode capacity at 0.1 CmA (CmA: the theoretical capacity of the cell) and at 20° C. and discharging at 0.2 CmA and at 20° C. until the terminal voltage of the battery reached 1.0 V. Thereafter, the battery was evaluated on internal pressure characteristics, charge and discharge cycle life characteristics and high-rate discharge characteristics.

As the internal pressure, was employed the internal pressure when the battery was charged to 120% of positive electrode capacity at a current value of 1 CmA at 20° C. As for the charge and discharge cycle life characteristics, the battery was repeatedly subjected to charge and discharge cycles, one cycle of which comprised charging to 120% of positive electrode capacity at 1 CmA at 20° C. and discharging at 1 CmA and at 20° C. until the terminal voltage decreased to 1.0 V. The discharge capacity at the second charge and discharge cycle was employed as the initial capacity of the battery, and the number of cycles when discharge capacity decreased to 60% of the initial capacity of the battery was employed as charge and discharge cycle life characteristics of the battery.

As for the high-rate discharge characteristics, battery was subjected to ten charge and discharge cycles, one cycle of which comprised charging to 120% of positive electrode capacity at 1 CmA at 20° C. and discharging at 1 CmA at 20° C. until the terminal voltage of the battery reached 1.0 V. Thereafter, the battery was charged to 120% of positive electrode capacity at 1 CmA in an atmosphere of 20° C. and discharged at 5 CmA at 0° C. until the voltage reached 0.8 V, and an average discharge voltage and a ratio of discharge capacity to initial capacity were obtained.

Table 1 shows the internal pressure characteristics, the charge and discharge cycle life characteristics and the high-rate discharge characteristics of the six batteries.

TABLE 1

| | High-rate discharge characteristics | | | |
|---|---|---|---|---|
| Battery | Average discharge voltage after 12 cycles of charge and discharge (V) | Discharge capacity ratio after 12 cycles of charge and discharge (%) | Internal pressure at the 3rd cycle of charge and discharge (kgf/cm$^2$) | Charge and discharge cycle life (Cycle) |
| A1 | 1.02 | 91 | 5.4 | 800 |
| A2 | 1.04 | 92 | 5.8 | 770 |
| A3 | 1.05 | 91 | 5.9 | 765 |
| A4 | 1.08 | 95 | 4.6 | 815 |
| B1 | 0.95 | 85 | 7.2 | 748 |
| B2 | 0.97 | 88 | 7.0 | 665 |

Internal pressure, and charge and discharge cycle life characteristics:

From Table 1, it can be seen that the batteries A1–A4 of the example were lower in internal pressure and improved in charge and discharge cycle life characteristics as compared with the batteries B1 and B2 of the comparative example.

This is because in the case of the batteries A1–A4, after the treatment of the surface of the hydrogen-absorbing alloy powders used for the negative electrode, and before drying, the hydrogen absorbed in the alloy powders was removed by reacting with the dehydrogenating agent, and the heat generated by the reaction was rapidly diffused and released into the aqueous solution as a medium by stirring. Thus, since generation of heat at the surface portion of the alloy was inhibited, oxidation of nickel in the alloy powders due to generation of heat was inhibited, and, as a result, deterioration of the catalytic activity could be inhibited. Therefore, the internal pressure could be kept low, and the charge and discharge life cycle of the batteries was also improved.

On the other hand, in the case of the battery B1 of the comparative example, a bonding reaction between hydrogen absorbed in the alloy powders and oxygen in the air at the time of drying as shown in formula (6) took place and the nickel portion of the alloy surface was oxidized due to the generation of heat. For this reason, catalytic activity of nickel was deteriorated to cause increase of internal pressure and shortening of the life cycle. In the case of the battery B2 of the comparative example, since the hydrogen absorbed in the alloy powders was not removed, a part of the alloy powders was still in charged state and electrode capacities of positive and negative electrodes were ill balanced. As a result, the gas absorption ability was deteriorated, the internal pressure increased, and the life cycle shortened.

High-rate Discharge Characteristics:

Furthermore, it can be seen from Table 1 that the batteries A1–A4 of the example increased in the average discharge voltage and were greater in the discharge capacity ratio in discharging at high-rate than the batteries B1 and B2 of the comparative example. It is presumed that this is because in the batteries A1–A4 of the example, the hydrogen absorbed in the alloy was removed without oxidation of nickel on the surface of the hydrogen-absorbing alloy powders used for the negative electrode, and the readily oxidizable rare earth elements and metal components such as Mn and Al were further dissolved out in the dehydrogenation step to further richen nickel on the alloy surface contacting with pores between exposed nickel and nickel in metallic state, and resistance against electrochemical reaction on the surface of the alloy powders was further diminished.

On the other hand, the battery B1 of the comparative example was lower in average discharge voltage at high-rate discharging and in discharge capacity ratio. It is considered that this is because since the nickel portion of the alloy surface was oxidized due to the generation of heat at drying as mentioned above, the catalytic activity of nickel deteriorated, and, furthermore, since the nickel-rich layer of high catalytic activity was not sufficiently formed on the alloy surface contacting with the pores between the exposed nickel and nickel in metallic state, the resistance against the electrochemical reaction on the surface of the alloy powders was not sufficiently diminished.

Being different from the battery B1, in the battery B2 of the comparative example in which the hydrogen-absorbing alloy of the negative electrode was prepared by drying the alloy powders using an inert gas, the nickel portion of the alloy surface was not oxidized. However, like the battery B1, the nickel-rich layer of high catalytic activity was also not sufficiently formed on the alloy surface contacting with the pores between the nickel and nickel. It is presumed that for this reason, the resistance against the electrochemical reaction on the surface of alloy powders was also not sufficiently diminished, and the battery B2 was lower in average discharge voltage at high-rate discharging and in discharge capacity ratio than the batteries A1–A4 of the example.

Moreover, in the battery A4 of the example, hydrogen peroxide was used as a dehydrogenating agent in preparation of the hydrogen-absorbing alloy powders a4. This hydrogen peroxide reacts with acetate ion to produce more peracetate ion on the surface of alloy powders than in a1–a3 and can most effectively perform selective dissolution and removal of rare earth elements and metal components such as Mn and Al. Therefore, the battery A4 was the best in high-rate discharge characteristics.

Example 2

Battery characteristics of alloys prepared with changing the amount of hydrogen peroxide added to the hydrogen-absorbing alloy powders were examined. Hydrogen absorbing-alloy was ground and subjected to the alkali treatment and the acid treatment under the same conditions as in preparation of alloy a4. Then, thereto was added aqueous hydrogen peroxide of 10% by weight in concentration at 50° C. with changing the proportion of hydrogen peroxide to the alloy as shown in Table 2, followed by stirring. Washing with water was carried out twice, followed by drying to obtain hydrogen-absorbing alloy powders c1–c5 of Example 2.

Then, batteries were made in the same manner as in making the battery A4, except that the alloy powders c1–c5 were used for the negative electrode. The resulting batteries were called nickel-metal hydride storage batteries C1–C5 of Example 2 (the battery C3 was the same as the battery A4).

These batteries C1–C5 were subjected to the same battery tests as in Example 1. The results are shown in the following Table 2.

TABLE 2

| Battery | Amount of hydrogen peroxide used for preparation of alloy powders (wt %) | High-rate discharge characteristics | | Internal pressure at the 3rd cycle of charge and discharge (kgf/cm$^2$) | Charge and discharge cycle life (Cycle) |
| --- | --- | --- | --- | --- | --- |
| | | Average discharge voltage after 12 cycles of charge and discharge (V) | Discharge capacity ratio after 12 cycles of charge and discharge (%) | | |
| C1 | 0.2 | 1.03 | 91 | 6.4 | 754 |
| C2 | 0.5 | 1.07 | 94 | 4.6 | 795 |
| C3 | 1.5 | 1.08 | 95 | 4.6 | 815 |
| C4 | 3.0 | 1.07 | 93 | 5.2 | 780 |
| C5 | 4.0 | 1.02 | 91 | 6.9 | 747 |
| B1 | — | 0.95 | 85 | 7.2 | 748 |
| B2 | — | 0.97 | 88 | 7.0 | 665 |

It can be seen from Table 2 that as for the high-rate discharge characteristics the batteries C1–C5 of the example were higher than the batteries B1 and B2 of the comparative example in average discharge voltage and discharge capacity ratio. Furthermore, much better results were obtained in the batteries C2–C4 on internal pressure characteristics and charge and discharge cycle life characteristics than the batteries B1 and B2 of the comparative example.

From the above results, when importance is attached to the high-rate discharge characteristics, the amount of hydrogen peroxide (based on the weight of alloy) used for dehydrogenation treatment is preferably 0.2–4.0% by weight. In order to improve additionally the internal pressure and the charge and discharge cycle life characteristics, a range of 0.5–3.0% by weight is more preferred.

In the preparation of hydrogen-absorbing alloy powders mentioned above, aqueous hydrogen peroxide of 10% by weight in concentration was used, but aqueous hydrogen peroxide of 3–30% by weight in concentration can also be used and the similar effect can be obtained by properly changing the amount so as to give the above-mentioned range. Moreover, in the preparation of hydrogen-absorbing alloy powders mentioned above, the temperature of the aqueous solution when aqueous hydrogen peroxide was added was 50° C., but the similar effect can be obtained when the temperature is in the range of 30–80° C.

Example 3

A hydrogen-absorbing alloy represented by $MmNi_{3.55}Co_{0.75}Mn_{0.4}Al_{0.3}$ as mother alloy 1 was ground to an average particle diameter of 30 μm in water by a wet ball mill.

Then, the alloy was stirred at 80° C. for 60 minutes in an aqueous KOH solution having a specific gravity of 1.30. Thereafter, the alloy powders were washed with water until pH of the washing water after washing reached 10 or less and then stirred in an aqueous acetic acid solution of pH 3.0 at 60° C. for 20 minutes as an acid treatment. Successively, in the state of acetate ion being retained, the alloy powders were stirred in the aqueous solution containing acetate ion at 50° C. with adding aqueous hydrogen peroxide of 10% by weight in concentration in an amount of 1.5% by weight in terms of hydrogen peroxide based on the alloy, thereby to perform dehydrogenation treatment.

Consecutively, washing with water was carried out twice, and to the aqueous solution was added an aqueous potassium hydroxide solution until pH of the aqueous solution after washed twice reached 12, thereby to perform modification with OH⁻ group (addition of OH⁻ group), followed by drying to prepare hydrogen-absorbing alloy powders d of Example 3. FIG. 1(e) is a schematic sectional view showing the surface state of the alloy powders d. In FIG. 1(e), 1 indicates the mother alloy, 4 indicates nickel in metallic state, 7 indicates a nickel-rich layer, and 8 indicates OH⁻ group.

A battery was made in the same manner as in making the battery A4, except that the resulting alloy powders d were used. This battery was nickel-metal hydride storage battery D of Example 3.

The above batteries D and A4 of the example and the battery B1 of the comparative example were subjected to initial activation in the same manner as in Example 1. Then, after charging and discharging, internal pressure, life characteristics and high-rate discharge characteristics were evaluated under the same conditions as in Example 1, and initial high-rate discharge characteristics were evaluated in the following manner.

That is, the batteries were subjected to one charge and discharge cycle which comprised charging to 120% of positive electrode capacity at 1 CmA and at 20° C. and discharging at 1 CmA and at 20° C. until the terminal voltage of the batteries reached 1.0 V. Thereafter, the batteries were charged to 120% of positive electrode capacity at 1 CmA and at 20° C. and discharged at 5 CmA and at 0° C. until the voltage reached 0.8 V, and the initial high-rate discharge characteristics were evaluated by the average discharge voltage and the ratio of discharge capacity to initial capacity.

The high-rate discharge characteristics, internal pressure, and charge and discharge cycle life are shown in the following Table 3.

TABLE 3

| Battery | Initial high-rate discharge characteristics | | High-rate discharge characteristics | | Internal pressure (kgf/cm²) | Charge and Discharge cycle life (Cycle) |
|---|---|---|---|---|---|---|
| | Average discharge voltage (V) | Discharge capacity ratio (%) | Average discharge voltage (V) | Discharge capacity ratio (%) | | |
| D | 1.07 | 94 | 1.10 | 96 | 4.6 | 818 |
| A4 | 0.93 | 85 | 1.08 | 95 | 4.6 | 815 |
| B1 | 0.89 | 74 | 0.95 | 85 | 7.2 | 748 |

It can be seen from Table 3 that the batteries D and A4 of the example were superior to the battery B1 of the comparative example in all of the internal pressure characteristics, life characteristics and high-rate discharge characteristics. Furthermore, as to the initial high-rate discharge characteristics, the battery D was 14 mV higher in average discharge voltage and 9% higher in discharge capacity ratio than the battery A4. It is considered due to the above-mentioned reasons that the battery D was the best in initial high-rate discharge characteristics.

In general, the OH⁻ group in the vicinity of the alloy surface was instantaneously consumed by the high-rate discharging in nickel-metal hydride storage battery. The OH⁻ group further needed is supplied from electrolyte by diffusion, but when the consumption exceeds the supply, polarization of the negative electrode increases and the discharge voltage decreases. This occurs conspicuously at the initial stage of the cycle. With proceeding of the charge and discharge cycle, activation of the alloy and wettability of the electrode surface with the electrolyte are improved and the polarization is relaxed.

Regarding the surface of alloy powders of the negative electrode in the battery D, the surface of nickel 4 in metallic state and the surface of nickel-rich layer 7 are previously modified with OH⁻ group 8 at the preparation of the alloy as shown in FIG. 1(e), and, hence, sufficient OH⁻ group 8 can also be instantaneously provided at the initial high-rate discharging. It is considered that for this reason the battery D was the best in initial high-rate discharge characteristics.

Example 4

Difference in battery characteristics due to difference in the amount of OH⁻ group added to the surface of hydrogen-absorbing alloy powders was examined. Hydrogen-absorbing alloy was ground and subjected to the alkali treatment and the acid treatment under the same conditions as in the battery D of Example 3. Thereafter, the alloy powders were stirred in the aqueous solution containing acetate ion at 50° C. with adding aqueous hydrogen peroxide of 10% by weight in concentration in an amount of 1.5% by weight in terms of hydrogen peroxide based on the alloy, thereby to perform dehydrogenation treatment. Then, to the aqueous solution was added an aqueous potassium hydroxide solution until pH of the aqueous solution after washed twice reached 10, 11, 12, 13 or 14, followed by drying. Batteries E1–E5 of Example 4 were made in the same manner as in making the battery A1 of Example 1 (battery E3 was the same as the battery D). Battery characteristics of the batteries E1–E5 were evaluated under the same conditions as in Example 3. The resulting initial high-rate discharge characteristics, internal pressure and charge and discharge cycle life are shown in the following Table 4.

TABLE 4

| Battery | pH of Aqueous solution | Initial high-rate discharge characteristics | | Internal pressure (kgf/cm$^2$) | Charge and discharge cycle life (Cycle) |
| --- | --- | --- | --- | --- | --- |
| | | Average discharge voltage (V) | Discharge capacity ratio (%) | | |
| E1 | 10 | 0.97 | 88 | 4.7 | 815 |
| E2 | 11 | 1.04 | 95 | 4.4 | 814 |
| E3 | 12 | 1.07 | 94 | 4.6 | 818 |
| E4 | 13 | 1.09 | 96 | 4.9 | 818 |
| E5 | 14 | 1.10 | 91 | 6.9 | 755 |
| A4 | — | 0.93 | 85 | 4.6 | 815 |

It can be seen from Table 4 that the batteries E1–E5 in which the surface of nickel in metallic state and the surface of nickel-rich layer formed on the alloy surface contacting with pores were modified with OH$^-$ group were further improved in initial high-rate discharge characteristics as compared with the battery A4.

This is because, as mentioned above, sufficient OH$^-$ groups could be instantaneously provided at the initial stage of high-rate discharging by modifying with OH$^-$ group the surface of nickel in metallic state and the surface of nickel-rich layer formed on the alloy surface contacting with pores.

Furthermore, if pH of the aqueous solution after washed twice was lower than 10, the amount of OH$^-$ groups added decreased and, hence, improvement of high-rate discharge characteristics from the initial stage of charging and discharging was small. Therefore, it is preferred to adjust pH of the alkaline aqueous solution to the range of 10–14 in modification with OH$^-$ group. If pH of the aqueous solution after washed twice was higher than 13, the high-rate discharge characteristics from the initial stage of the charge and discharge cycle of the battery is improved, but the internal pressure characteristics and the charge and discharge cycle life characteristics are deteriorated. Therefore, in order to provide a battery which is further excellent in internal pressure and charge and discharge cycle life characteristics in addition to the high-rate discharge characteristics from the initial stage of charge and discharge cycle of the battery, it is most preferred to adjust pH of the alkaline aqueous solution to the range of 11–13 as shown in Table 4.

In Example 4 of the present invention, aqueous potassium hydroxide solution was used as an alkaline aqueous solution for OH$^-$ modification, but aqueous solutions of all alkalis such as sodium hydroxide, lithium hydroxide and the like, and, besides, mixtures of these alkaline aqueous solutions can be used to obtain similar effects.

Furthermore, in this example, the high-rate discharge test was conducted at 5 CmA at the atmosphere of 0° C. where the effect is more conspicuously developed, but the effect in the similar tendency can be obtained even at a higher temperature such as 20° C. or 45° C. The effect can also be obtained when the discharge is carried out at further higher current value.

What is claimed is:

1. A method for producing a hydrogen-absorbing alloy for batteries which comprises a first step of grinding a hydrogen-absorbing alloy comprising at least one rare earth element, nickel and at least one transition metal to prepare alloy powders, a second step of treating the alloy powders in an alkaline aqueous solution, a third step of treating the alloy powders in an acidic aqueous solution, and a fourth step of a dehydrogenation treatment to remove hydrogen absorbed in the alloy powders in the presence of acetate ion in an aqueous solution.

2. A method according to claim 1, wherein the dehydrogenation treatment is carried out using oxygen as a dehydrogenating agent and comprises stirring the alloy powders in the aqueous solution with blowing air or oxygen into the aqueous solution.

3. A hydrogen-absorbing alloy produced according to the method of claim 2.

4. A method according to claim 1, wherein the dehydrogenation treatment is carried out using a peroxide represented by the formula $B_2O_2$ (in which B denotes H, Li, Na or K) as a dehydrogenating agent and comprises stirring the alloy powders in the aqueous solution with adding the peroxide to the aqueous solution.

5. A method according to claim 4, wherein the peroxide is aqueous hydrogen peroxide.

6. A method according to claim 5, wherein the aqueous hydrogen peroxide is added in an amount of 0.2–4.0% by weight in terms of hydrogen peroxide based on the alloy powder.

7. A hydrogen-absorbing alloy produced according to the method of claim 6.

8. A hydrogen-absorbing alloy produced according to the method of claim 4.

9. A method according to claim 5, wherein the temperature of the aqueous solution when the aqueous hydrogen peroxide is added is 30–80° C.

10. A hydrogen-absorbing alloy produced according to the method of claim 9.

11. A hydrogen-absorbing alloy produced according to the method of claim 5.

12. A method according to claim 1, wherein the dehydrogenation treatment is carried out using a peroxodisulfate represented by the formula $D_2S_2O_8$ (in which D denotes Li, Na or K) as a dehydrogenating agent and comprises stirring the alloy powders in an aqueous solution with adding the peroxodisulfate.

13. A hydrogen-absorbing alloy produced according to the method of claim 12.

14. A hydrogen-absorbing alloy produced according to the method of claim 1.

15. A method for producing a hydrogen-absorbing alloy for batteries which comprises a first step of grinding a hydrogen-absorbing alloy containing at least one rare earth element, nickel and at least one transition metal to prepare alloy powders, a second step of treating the alloy powders in an alkaline aqueous solution, a third step of treating the alloy powders in an acidic aqueous solution, a fourth step of a dehydrogenation treatment to remove hydrogen absorbed in the alloy powders in the presence of acetate ion in an aqueous solution, and a fifth step of adding an alkali to the aqueous solution.

16. A method according to claim 15, wherein pH of the aqueous solution is adjusted to 10–14 by the addition of the alkali in the fifth step.

17. A hydrogen-absorbing alloy produced according to the method of claim 16.

18. A method according to claim 15, wherein pH of the aqueous solution is adjusted to 11–13 by the addition of the alkali in the fifth step.

19. A hydrogen-absorbing alloy produced according to the method of claim 18.

20. A hydrogen-absorbing alloy produced according to the method of claim 15.

21. A method for producing a hydrogen-absorbing electrode, said method comprising:

(a) producing a hydrogen-absorbing alloy by a first step of grinding a hydrogen-absorbing alloy comprising at least one rare earth element, nickel and at least one transition metal to prepare alloy powders, a second step of treating the alloy powders in an alkaline aqueous solution, a third step of treating the alloy powders in an acidic aqueous solution, and a fourth step of a dehydrogenation treatment to remove hydrogen absorbed in the alloy powders in the presence of acetate ion in an aqueous solution;

(b) kneading said hydrogen-absorbing alloy produced according to step (a) with a thickening agent or binder and water to prepare a paste; and (c) coating the paste on a metallic substrate.

22. The method according to claim 21, wherein the dehydrogenation treatment is carried out using oxygen as a dehydrogenating agent and comprises stirring the alloy powders in the aqueous solution with blowing air or oxygen into the aqueous solution.

23. The method according to claim 21, wherein the dehydrogenation treatment is carried out using a peroxide represented by the formula $B_2O_2$ (in which B denotes H, Li, Na or K) as a dehydrogenating agent and comprises stirring the alloy powders in the aqueous solution with adding the peroxide to the aqueous solution.

24. The method according to claim 23, wherein the peroxide is aqueous hydrogen peroxide.

25. The method according to claim 24, wherein the aqueous hydrogen peroxide is added in an amount of 0.2–4.0% by weight in terms of hydrogen peroxide based on the alloy powder.

26. The method according to claim 23, wherein the temperature of the aqueous solution when the aqueous hydrogen peroxide is added is 30–80° C.

27. The method according to claim 21, wherein the dehydrogenation treatment is carried out using a peroxodisulfate represented by the formula $D_2S_2O_8$ (in which D denotes Li, Na or K) as a dehydrogenating agent and comprises stirring the alloy powders in an aqueous solution with adding the peroxodisulfate.

28. A method for producing a hydrogen-absorbing electrode, said method comprising:

(a) producing a hydrogen-absorbing alloy for batteries by a first step of grinding a hydrogen-absorbing alloy containing at least one rare earth element, nickel and at least one transition metal to prepare alloy powders, a second step of treating the alloy powders in an alkaline aqueous solution, a third step of treating the alloy powders in an acidic aqueous solution, a fourth step of a dehydrogenation treatment to remove hydrogen absorbed in the alloy powders in the presence of acetate ion in an aqueous solution, and a fifth step of adding an alkali to the aqueous solution;

(b) kneading the hydrogen-absorbing alloy produced by step (a) with a thickening agent or binder and water to prepare a paste and (c) coating the paste on a metallic substrate.

29. The method according to claim 28, wherein pH of the aqueous solution is adjusted to 10–14 by the addition of the alkali in the fifth step.

30. The method according to claim 28, wherein pH of the aqueous solution is adjusted to 11–13 by the addition of the alkali in the fifth step.

* * * * *